United States Patent
Badaye et al.

(10) Patent No.: US 6,927,761 B2
(45) Date of Patent: Aug. 9, 2005

(54) MOISTURE DEFLECTOR FOR CAPACITIVE NFI TOUCH SCREENS FOR USE WITH BEZELS OF CONDUCTIVE MATERIAL

(75) Inventors: Massoud Badaye, Vancouver (CA); Gary O. Kaga, West Vancouver (CA)

(73) Assignee: 3M Innovative Properties Company, St. Paul, MN (US)

( * ) Notice: Subject to any disclaimer, the term of this patent is extended or adjusted under 35 U.S.C. 154(b) by 454 days.

(21) Appl. No.: 10/113,006

(22) Filed: Mar. 29, 2002

(65) Prior Publication Data

US 2003/0184523 A1 Oct. 2, 2003

(51) Int. Cl.[7] .............................................. G08C 21/00
(52) U.S. Cl. ...................... 345/173; 345/174; 345/905; 349/149; 349/153; 349/155; 349/190; 361/679; 361/681
(58) Field of Search ................................. 345/173, 174, 345/905; 349/149, 153, 155, 190; 361/679, 681

(56) References Cited

U.S. PATENT DOCUMENTS

| | | | |
|---|---|---|---|
| 5,457,289 A | * 10/1995 | Huang et al. ............ 178/18.08 |
| 5,594,471 A | 1/1997 | Deeran et al. | |
| 5,631,805 A | 5/1997 | Bonsall | |
| 5,636,101 A | 6/1997 | Bonsall et al. | |
| 5,640,296 A | 6/1997 | Bonsall et al. | |
| 5,650,597 A | 7/1997 | Redmayne | |
| 6,198,515 B1 | * 3/2001 | Cole ........................... 348/836 |
| 6,532,152 B1 | * 3/2003 | White et al. ................. 361/692 |
| 6,612,866 B2 | * 9/2003 | Germer et al. .............. 439/517 |
| 6,639,577 B2 | * 10/2003 | Eberhard ..................... 345/102 |
| 6,750,937 B2 | * 6/2004 | Karasawa et al. .......... 349/153 |
| 2003/0067447 A1 | * 4/2003 | Geaghan et al. ............ 345/173 |

* cited by examiner

Primary Examiner—Bipin Shalwala
Assistant Examiner—Vincent E. Kovalick
(74) Attorney, Agent, or Firm—Robert J. Pechman

(57) ABSTRACT

A non-conductive barrier between a touch screen and a conductive bezel is described. The non-conductive barrier attaches to a capacitive touch screen and forms a lip over a grounded bezel. The non-conductive barrier is constructed of a material and dimension sufficient to prevent liquid streaming down the touch screen from electrically coupling an active area of the touch screen to the grounded bezel.

21 Claims, 2 Drawing Sheets

MOISTURE DEFLECTOR FOR CAPACITIVE NFI TOUCH SCREENS FOR USE WITH BEZELS OF CONDUCTIVE MATERIAL

BACKGROUND

Touch screens are becoming very popular as an input mechanism for computer systems. Various types of touch screens have emerged, but one format is a Near Field Imaging (NFI) capacitive touch screen. With an NFI capacitive touch screen, an electric field is created on conductive bars within the active portion of the touch screen. When an object, such as a user's finger, comes in close proximity to the active area of the touch screen, it causes a modulation of the electric field, which is sensed by a controller connected to the conductive bars. By analyzing the modulation of the electric field, a location of the contact on the touch screen can be resolved. Typically, the touch screen is surrounded at the edges by a grounded conductive surface (a bezel). To avoid an influence on the electric field due to the conductive bezel, a small region of the touch screen immediately proximate to the bezel is left inactive.

The term "inactive" is intended to mean any mechanism or process by which a region or portion of the touch screen is made to be less susceptible to variations in the electric field than other regions or portions of the touch screen. For example, portions of the underlying sensing circuit may be shielded to avoid recognizing contact or touches in that area. Alternatively, the sensing circuitry may be omitted from a portion of the screen to turn it inactive. Moreover, some combination of eliminating active components together with shielding other active components may be employed.

Some aspects of NFI capacitive touch screens have made them popular for use in difficult environments, such as outdoors applications and applications in the manufacturing industry. For example, NFI capacitive touch screens are effective at discriminating between near field signals and far field signals. Thicker protective layers may be used over the conductive bars while still achieving satisfactory performance. Thicker protective layers enable NFI touch screens to be manufactured that can withstand many of the environmental challenges of these difficult environments. However, certain environmental conditions continue to pose a problem. For instance, NFI capacitive touch screens may be used in environments where the screen is susceptible to conductive liquids like water. These are common in manufacturing and other such applications. A problem occurs if the conductive liquid streams down the touch screen to effectively bridge the inactive region between the active area of the touch screen and the conductive bezel. A similar problem occurs if the conductive liquid streams down at the top of the screen from the conductive bezel over the inactive region onto the active area. If this occurs, errors or false touches are generally registered.

Attempts have been made to address this problem. For instance, the inactive region has sometimes been made of sufficient width that accumulated liquids along the bottom lip of the bezel did not reach the active area of the touch screen. However, this solution did not address the more likely situation that the liquid forms a stream running down the touch screen. Another attempted solution was to try and filter out false touch signals created by streaming liquids. The controller was configured to filter out touch profiles that were highly likely to have been caused by streaming liquids. Although this solution was effective at substantially reducing errors and false touches, it introduced a longer processing delay to register actual touches, which is an undesirable byproduct. Unfortunately, an acceptable solution to this and other similar problems has eluded those skilled in the art.

SUMMARY OF THE INVENTION

The present invention addresses the above-described problems, among others, by providing a non-conductive barrier between a touch screen and a conductive bezel. Briefly stated, a non-conductive barrier is provided that attaches to a capacitive touch screen and forms a lip over a grounded bezel. The non-conductive barrier is constructed of a material and dimension sufficient to prevent liquid streaming down the touch screen from electrically coupling an active area of the touch screen to the grounded bezel.

In one aspect, the invention is directed at a non-conductive barrier configured to be attached to a display unit. The display unit includes a capacitive touch screen and a bezel at least partially surrounding the capacitive touch screen. The non-conductive barrier forms a discontinuity in a stream of liquid flowing between the capacitive touch screen and the bezel.

In another aspect, the invention is directed at a touch sensitive display unit including a capacitive touch screen, a grounded bezel, and a non-conductive barrier. The capacitive touch screen includes an active portion and an inactive portion. The grounded bezel at least partially surrounds the touch screen. The non-conductive barrier is positioned to separate the capacitive touch screen from the grounded bezel such that a liquid streaming down the touch sensitive display unit does not form a conductive path coupling the active portion of the capacitive touch screen to the grounded bezel.

DETAILED DESCRIPTION OF THE PREFERRED EMBODIMENT

Briefly described, the present invention is directed at a non-conductive barrier for use in conjunction with a touch screen to prevent streaming liquids from directly or capacitively coupling an active portion of the touch screen with a conductive bezel around the touch screen. The non-conductive barrier is also configured to direct liquids streaming downward from an upper portion of the touch screen outward and away from the active portion of the touch screen.

Figure 1:
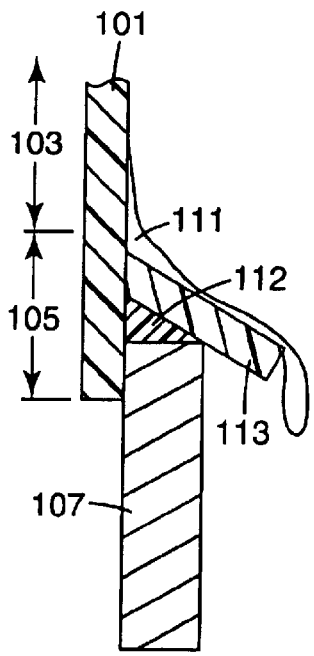
FIG. 1 is a cross-sectional cutaway view of a non-conductive barrier affixed to a capacitive touch screen, in accordance with one embodiment of the invention.

FIG. 1 is a cross-sectional cutaway view of a touch screen display 100 including one embodiment of the present invention. Preferably, the touch screen display 100 includes a Near Field Imaging (NFI) capacitive touch screen 101 having an active portion 103 and an inactive portion 105. As discussed above, an electric field is set up on the active portion 103 and a controller (not shown) senses a modulation of the electric field caused by a touch or contact on or near the active portion 103. The inactive portion 105 serves as a buffer between the active portion 103 and a conductive bezel 107 to help prevent the conductive bezel 107 from influencing the electric field and causing capacitive coupling to the touch screen 101. In addition, a gasket may be used between the bezel 107 and the touch screen 101 to further insulate the two.

As described above, in some environments, conductive liquids (e.g., water) 111 may run down the surface of conventional touch screen displays essentially creating a conductive path from the active portion 103 over the inactive portion 105 and to the conductive bezel 107. However, in accordance with the invention, a non-conductive barrier 113 is used to prevent the conductive liquid 111 from electrically coupling the conductive bezel 107 to the active portion 103 of the touch screen 101. In essence, the non-conductive barrier 113 acts to prevent a single continuous stream of conductive liquid 111 from bridging the gap between the active portion 103 and the conductive bezel 107.

In the described embodiment, the non-conductive barrier 113 is attached to the touch screen 101 and extends or projects out from or over the bezel 107 a sufficient distance to prevent direct or capacitively-coupled contact between the active portion 103 and the conductive bezel 107. Preferably, the non-conductive barrier 113 is connected to the inactive portion 105 of the touch screen 101 to avoid an unnecessary load on the touch screen 101. Also preferably, to ease the flow of liquids 111 off the touch screen 101, the non-conductive barrier 113 may extend from the touch screen 101 at an obtuse angle so as not to cause streaming liquids to puddle or gather against the touch screen 101. In any event, it is envisioned that the non-conductive barrier 113 is constructed of appropriate design and affixed to the touch screen 101 in such a configuration that the angle between the non-conductive barrier 113 and the vertical plane is sufficient to prevent the streaming liquids 111 from forming an unbroken conductive path between the touch screen 101 and the bezel 107. Although depicted in FIG. 1 extending straight from the touch screen 101, it will be appreciated that many other configurations may work equally as well, such as a curved or otherwise shaped extension. Likewise, an alternative embodiment may include a lip portion (not shown) that more fully encloses the conductive bezel 107. The lip portion could provide more protection against the conductive liquid 111 forming a conductive path between the active portion 103 of the touch screen 101 and the conductive bezel 107.

The non-conductive barrier 113 may be constructed of any suitable non-conductive material, such as, in one example, 0.125 inch thick plastic. The non-conductive barrier 113 may be bonded to the touch screen 101 with any suitable non-soluble, non-conductive, non-hydroscopic sealing material 112, such as, in one example, RTV silicone.

Figure 2:
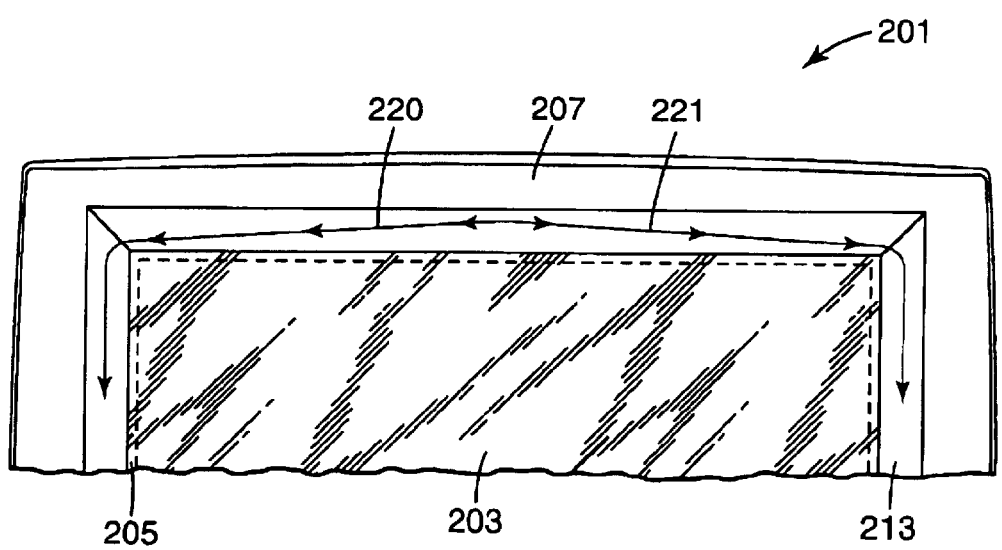
FIG. 2 is a frontal view of a non-conductive barrier affixed to a capacitive touch screen and having a portion at the upper end that slopes in two directions to cause a liquid to drain off to the side before overflowing onto the touch screen, in accordance with one embodiment of the invention.

FIG. 2 is a frontal view of a non-conductive barrier 213 affixed to an upper portion of a capacitive touch screen 201, in accordance with one embodiment of the present invention. In accordance with this embodiment, the non-conductive barrier 213 is again affixed or bonded to an inactive portion 205 of the touch screen 201 that forms a border between the active portion 203 of the touch screen and a conductive bezel 207. In this embodiment, the non-conductive barrier 213 forms a channel at the upper end that slopes from the middle downward in both directions (220, 221) to cause liquid to drain off to the side before overflowing onto the touch screen. FIG. 2 illustrates how a conductive liquid coming from above the touch screen 201 may be contained by the non-conductive barrier 213 and redirected around the upper portion of the touch screen to drain down along the sides of the touch screen 201. In an alternative embodiment, the upper channel is not sloped and is of sufficient depth that liquids drain off to the sides before overflowing onto the touch screen 201.

Figure 3:
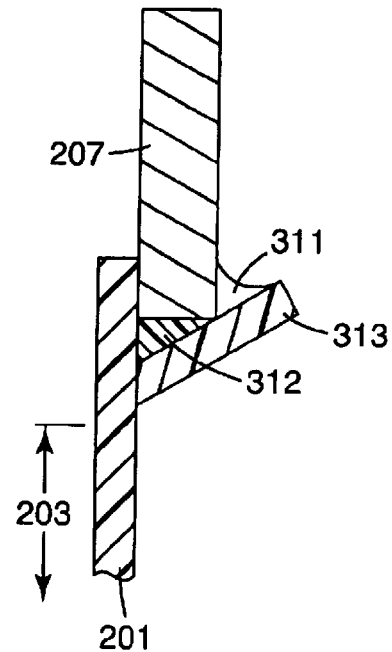
FIG. 3 is a cross-sectional cutaway view of the upper portion of the non-conductive barrier illustrated in FIG. 2 and connected to the upper portion of the touch screen 301, in accordance with the invention.

FIG. 3 is a cross-sectional cutaway view of the upper portion of the non-conductive barrier 213 illustrated in FIG. 2 and connected to the upper portion of the touch screen 201. FIG. 3 illustrates how the non-conductive barrier 213 essentially traps conductive liquid 311 that flows down the conductive bezel 207 from above the touch screen 201. The non-conductive barrier 213 accumulates the liquid 311 and redirects the liquid to flow down the sides of the touch screen 201, as illustrated in FIG. 2. In this way, the liquid 311 does not form a conductive path between the conductive bezel 207 and the active portion 203 of the touch screen 201. Again, it should be noted that the non-conductive barrier 213 is attached to the touch screen 201, and a non-conductive sealing material 312 is used to form a bond between the non-conductive barrier 213 and either the touch screen 201, the conductive bezel 207, or both. It should be appreciated that although the invention has been described in terms of embodiments having the non-conductive barrier affixed to the touch screen, the non-conductive barrier could equally be attached to the conductive bezel while serving the same purpose in substantially the same manner.

Figure 4:
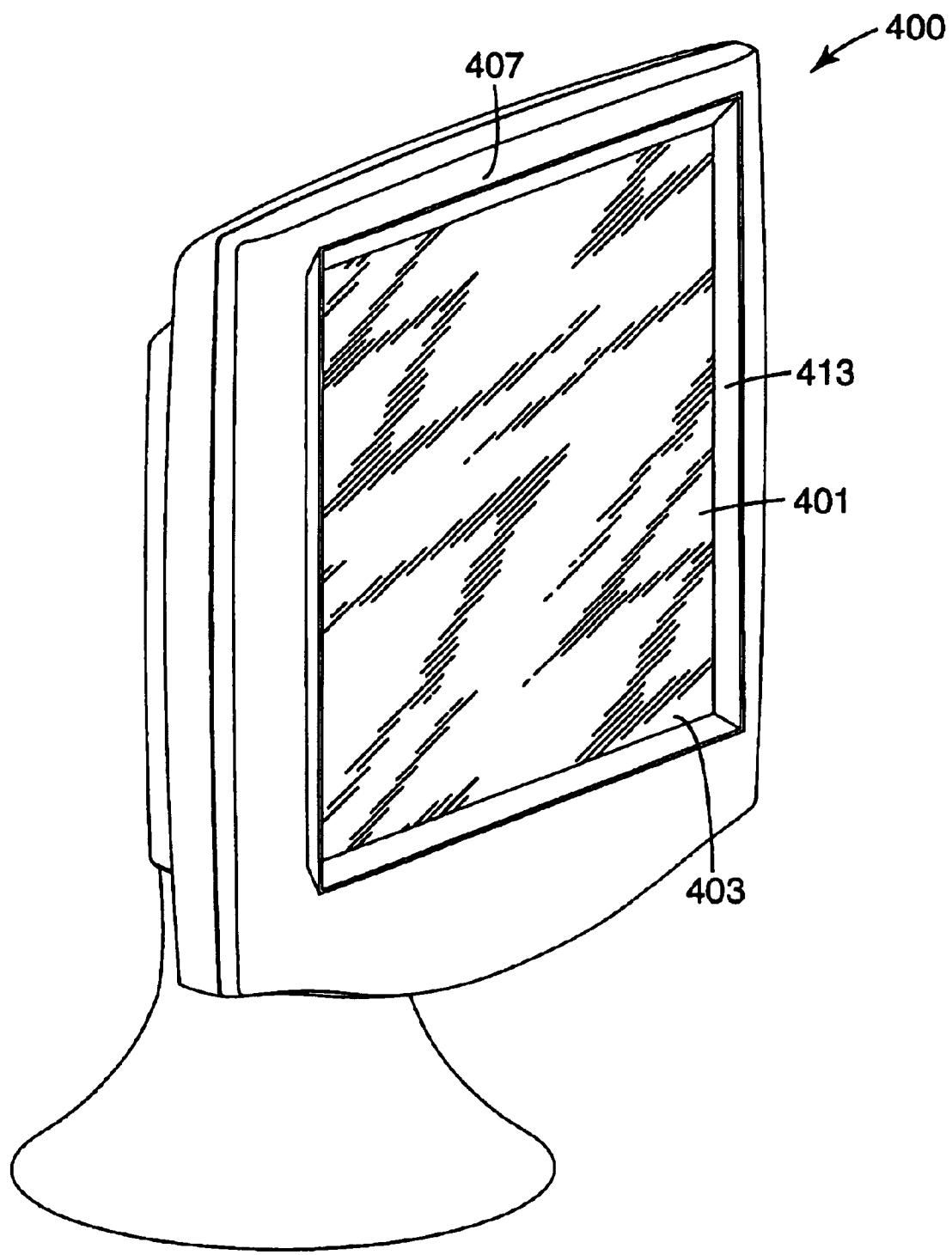
FIG. 4 is a perspective view of a capacitive touch screen fitted with a non-conductive barrier between the active area of the touch screen and the conductive bezel to address the problem of streaming liquids, in accordance with the invention.

FIG. 4 is a perspective view of a touch screen display 400 having a non-conductive barrier 413. An inactive portion of the touch screen 401 forms a border between an active portion 403 of the touch screen 401 and a conductive bezel 407. The non-conductive barrier 413 is attached to the touch screen 401, preferably in the inactive portion 405, and extends out to form a barrier to streaming liquids flowing down the touch screen 401 or the conductive bezel 407. Preferably the non-conductive barrier 413 is continuous and completely borders the bezel opening on all sides. In this way, conductive liquid flowing along one of the four sides of the non-conductive barrier 413 could not make its way between a crack or other discontinuity in the non-conductive barrier 413. Alternatively, some protection could still be gained from a discontinuous barrier placed on a portion of one or more sides of the touch screen 401.

In summary, a non-conductive barrier is used to prevent liquids from streaming down onto a capacitive touch screen and forming a conductive path between an active portion of the touch screen and a conductive bezel. In this way, many false signals and erroneous touches due to such conductive liquids are avoided.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus, comprising:
 a non-conductive barrier configured for attachment to a display unit, the display unit including a capacitive touch screen and a bezel at least partially surrounding the capacitive touch screen, the non-conductive barrier being sufficient to form a discontinuity in a stream of liquid flowing between the capacitive touch screen and the bezel.

2. The apparatus of claim 1, wherein the capacitive touch screen further comprises an active portion and an inactive portion, the inactive portion being an area of the capacitive touch screen between at least part of the active portion and the bezel.

3. The apparatus of claim 2, wherein the non-conductive barrier is configured for attachment to the inactive portion of the capacitive touch screen.

4. The apparatus of claim 2, wherein the non-conductive barrier is configured for attachment to the bezel of the display unit.

5. The apparatus of claim 1, wherein the non-conductive barrier is constructed of a non-conductive material.

6. The apparatus of claim 5, wherein the non-conductive material comprises plastic.

7. The apparatus of claim 1, further comprising a non-conductive sealing material adhered to the non-conductive barrier to join the non-conductive barrier to the display unit.

8. The apparatus of claim 7, wherein the non-conductive sealing material comprises silicone.

9. The apparatus of claim 1, wherein the non-conductive barrier is configured to extend out from the display unit at an obtuse angle from the touch screen.

10. A touch sensitive display unit, comprising:
    a capacitive touch screen having an active portion and an inactive portion;
    a grounded bezel at least partially surrounding the touch screen; and
    a non-conductive barrier positioned to separate the capacitive touch screen from the grounded bezel such that a liquid streaming down the touch sensitive display unit does not form a conductive path coupling the active portion of the capacitive touch screen to the grounded bezel.

11. The touch sensitive display unit of claim 10, wherein the non-conductive barrier is attached to the inactive portion of the capacitive touch screen.

12. The touch sensitive display unit of claim 10, wherein the non-conductive barrier is continuous around the entire capacitive touch screen.

13. The touch sensitive display unit of claim 10, wherein the non-conductive barrier is discontinuous.

14. The touch sensitive display unit of claim 13, wherein the non-conductive barrier is continuous along a single side of the capacitive touch screen.

15. The touch sensitive display unit of claim 10, wherein the non-conductive barrier is affixed to the touch sensitive display unit with a non-conductive sealing material.

16. The touch sensitive display unit of claim 15, wherein the non-conductive sealing material comprises silicone.

17. The touch sensitive display unit of claim 10, wherein at least a portion of the non-conductive barrier is constructed of plastic.

18. A method for reducing errors in a touch sensitive display unit including a capacitive touch screen and a bezel at least partially surrounding the capacitive touch screen, the method comprising:
    providing a non-conductive barrier configured for attachment to the display unit, the non-conductive barrier constructed to extend outwardly from the touch screen and to form a lip over the bezel a sufficient distance to cause a discontinuity in a stream of liquid flowing between the capacitive touch screen and the bezel.

19. The method of claim 18, further comprising attaching the non-conductive barrier to the touch sensitive display unit.

20. The method of claim 19, wherein the non-conductive barrier is attached to an inactive portion of the capacitive touch screen.

21. The method of claim 19, wherein the non-conductive barrier is attached to the bezel.

* * * * *